(12) United States Patent
Yanagita

(10) Patent No.: US 11,431,716 B2
(45) Date of Patent: Aug. 30, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Hiroshi Yanagita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 211 days.

(21) Appl. No.: 16/558,172

(22) Filed: Sep. 2, 2019

(65) Prior Publication Data

US 2020/0084218 A1 Mar. 12, 2020

(30) Foreign Application Priority Data

Sep. 11, 2018 (JP) .............................. JP2018-169359

(51) Int. Cl.
*H04L 9/40* (2022.01)
*G06F 21/31* (2013.01)
*G06F 21/62* (2013.01)

(52) U.S. Cl.
CPC ............ *H04L 63/101* (2013.01); *G06F 21/31* (2013.01); *G06F 21/6218* (2013.01); *H04L 63/102* (2013.01)

(58) Field of Classification Search
None
See application file for complete search history.

(56) References Cited

U.S. PATENT DOCUMENTS

| 8,763,145 B2 * | 6/2014 | Mihara | G06F 21/105 |
| | | | 726/26 |
| 2014/0189808 A1 * | 7/2014 | Mahaffey | H04L 63/083 |
| | | | 726/4 |
| 2016/0063416 A1 * | 3/2016 | Sharma | G06F 40/143 |
| | | | 705/7.23 |

FOREIGN PATENT DOCUMENTS

| JP | 4374904 | 12/2009 |
| JP | 5814639 | 11/2015 |
| WO | 2005003985 | 1/2005 |

* cited by examiner

*Primary Examiner* — Brandon Hoffman
(74) *Attorney, Agent, or Firm* — JCIPRNET

(57) ABSTRACT

An information processing apparatus includes: a registration unit that, for a role to be assigned to users who utilize a system, pre-registers authority to be granted and identity confirmation to be required in association with the role; a storage unit that, for each of the users, stores information on identity confirmation which has been performed by the users; and an authority control unit that, in response to assignment of a new role to a user, in a case where the storage unit stores information which indicates that the user has performed the identity confirmation associated to the new role, controls to validate authority associated with the new role.

11 Claims, 16 Drawing Sheets

FIG. 4

| ROLE | UTILIZATION AUTHORITY | IDENTITY CONFIRMATION REQUIREMENTS |
|---|---|---|
| PERSON IN CHARGE OF PAYMENT | PAYMENT PROCESSING<br>ACCESS TO INVOICE<br>CONTACT WITH ADMINISTRATOR | INPUT OF MAIL ADDRESS<br>CONFIRMATION OF MAIL ADDRESS COMMUNICATION<br>INPUT OF AFFILIATION INFORMATION<br>PRESENTATION OF EMPLOYEE ID CARD |
| PERSON IN CHARGE OF ORDER | ORDER PROCESSING<br>ACCESS TO INVOICE | INPUT OF MAIL ADDRESS<br>INPUT OF AFFILIATION INFORMATION<br>PRESENTATION OF EMPLOYEE ID CARD |

FIG. 5

| USER ID | PASSWORD | ROLE | CONFIRMED IDENTITY CONFIRMATION REQUIREMENTS | UNCONFIRMED IDENTITY CONFIRMATION REQUIREMENTS |
|---|---|---|---|---|
| Tanaka | ○○○○○○ | PERSON IN CHARGE OF PAYMENT | NONE | INPUT OF MAIL ADDRESS CONFIRMATION OF MAIL ADDRESS COMMUNICATION INPUT OF AFFILIATION INFORMATION PRESENTATION OF EMPLOYEE ID CARD |
| Kimura | ×××××× | PERSON IN CHARGE OF ORDER | INPUT OF MAIL ADDRESS INPUT OF ADDRESS | INPUT OF AFFILIATION INFORMATION PRESENTATION OF EMPLOYEE ID CARD |

FIG. 7

ROLE REGISTRATION

ROLE

PERSON IN CHARGE OF PAYMENT

AUTHORITY

- ORDER PROCESSING
- AUTHORIZATION OF ORDER
- PAYMENT PROCESSING
- AUTHORIZATION OF PAYMENT
- ACCESS TO INVOICE
- CHANGE OF ACCOUNT INFORMATION
- CONTACT WITH ADMINISTRATOR

IDENTITY CONFIRMATION REQUIREMENTS

- INPUT OF MAIL ADDRESS
- CONFIRMATION OF EMAIL ADDRESS COMMUNICATION
- INPUT OF ADDRESS
- CONFIRMATION OF POSTAL MAIL ADDRESS
- INPUT OF AFFILIATION INFORMATION
- PRESENTATION OF EMPLOYEE ID CARD

REGISTER

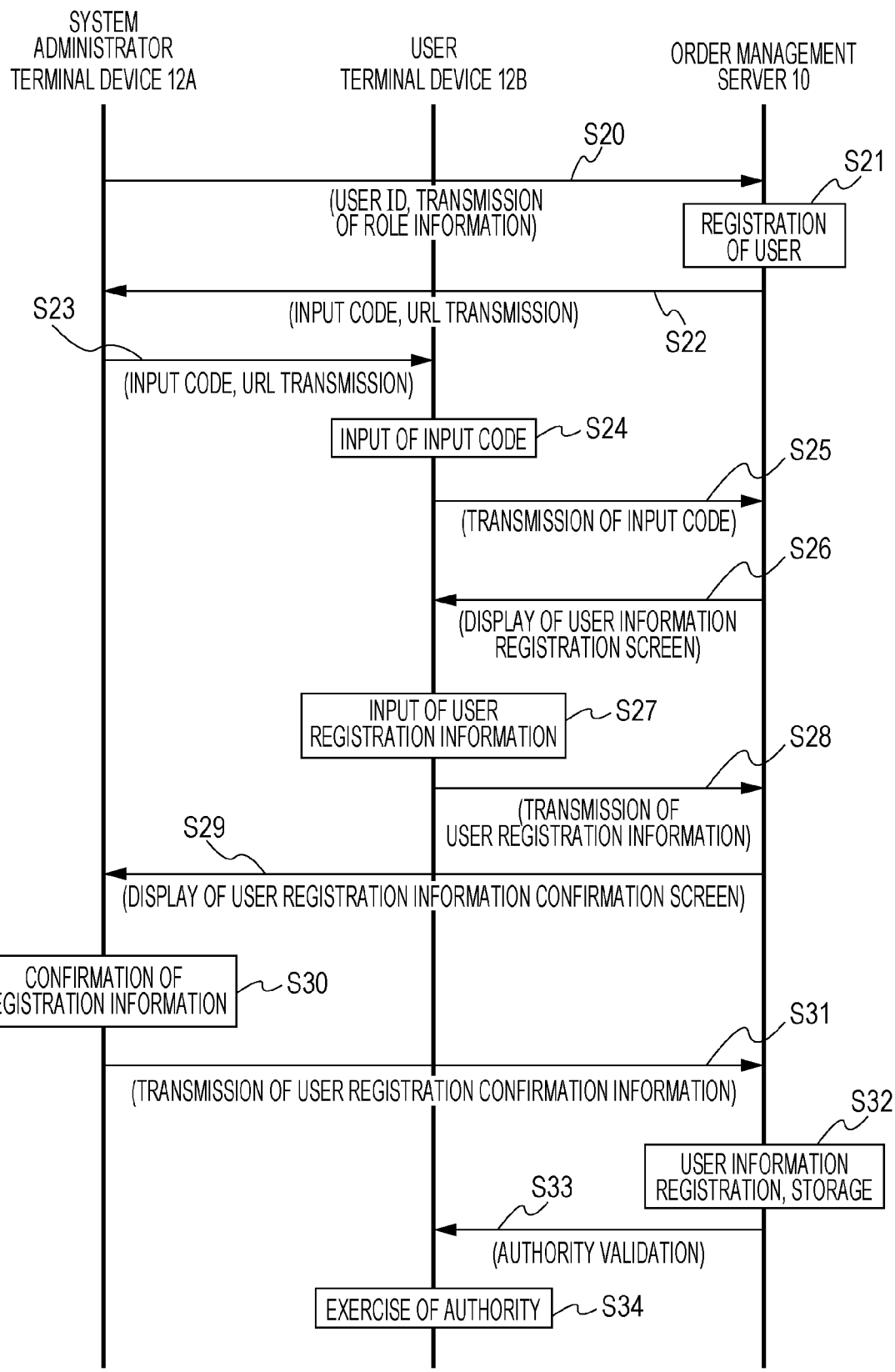

FIG. 9

USER REGISTRATION

USER ID

Tanaka

ROLE

PERSON IN CHARGE OF ORDER
ORDER AUTHORIZER
PERSON IN CHARGE OF PAYMENT
PAYMENT AUTHORIZER

NEXT

FIG. 12

USER INFORMATION REGISTRATION

USER ID

PASSWORD

MAIL ADDRESS

AFFILIATION

EMPLOYEE ID CARD

IMAGE FILE:    UPLOAD IMAGE

REGISTER ~27

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-169359 filed Sep. 11, 2018.

BACKGROUND

(i) Technical Field

The present disclosure relates to an information processing apparatus and a non-transitory computer readable medium storing a program.

(ii) Related Art

Japanese Patent No. 4374904 discloses an identity authentication system in which both a server and a client manage identity authentication methods, owned as functions, each including a biometric authentication method, the identity authentication methods owned by both are exchanged in a session between the server and the client, and an identity authentication method, which matches the policy of application of the server and the desire of a user, is selected.

Japanese Patent No. 5814639 discloses one or more servers that provide service to clients, the one or more servers including: a storage unit that stores a user management table in which a tenant who has contracted for service provision, users belonging to the tenant, and a role indicating access authority of each of the users in the licensed service are registered; a user interface unit that, in response to a request from a client, provides a user interface for setting a role of each user; and an update unit that updates the user management table according to the role set for the user via the user interface.

SUMMARY

Aspects of non-limiting embodiments of the present disclosure relate to an information processing apparatus and a non-transitory computer readable medium storing a program that, in a system which sets authority granted to a user and identity confirmation requirements demanded on the user for a role assigned to the user, only when the user meets the identity confirmation requirements, are capable of exercising authority granted to the role assigned to the user.

Aspects of certain non-limiting embodiments of the present disclosure address the above advantages andor other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a registration unit that, for a role to be assigned to users who utilize a system, pre-registers authority to be granted and identity confirmation to be required in association with the role; a storage unit that, for each of the users, stores information on identity confirmation which has been performed by the users; and an authority control unit that, in response to assignment of a new role to a user, in a case where the storage unit stores information which indicates that the user has performed the identity confirmation associated to the new role, controls to validate authority associated with the new role.

BRIEF DESCRIPTION OF THE DRAWINGS

Exemplary embodiment of the present disclosure will be described in detail based on the following figures, wherein:

FIG. 4 is a table illustrating an example of role information stored in a storage of the order management server;

FIG. 5 is a table illustrating an example of user information stored in the storage of the order management server;

FIG. 7 is a view illustrating a display example of a role registration screen in the terminal apparatus;

FIG. 8 is a chart for explaining a user information registration operation in the terminal apparatus, the other terminal apparatus, and the order management server;

FIG. 9 is a view illustrating a display example of a user registration screen in the terminal apparatus;

FIG. 12 is a view illustrating a display example of a user registration screen in the other terminal apparatus;

DETAILED DESCRIPTION

Hereinafter, an exemplary embodiment of the present disclosure will be described in detail with reference to the drawings.

Figure 1:
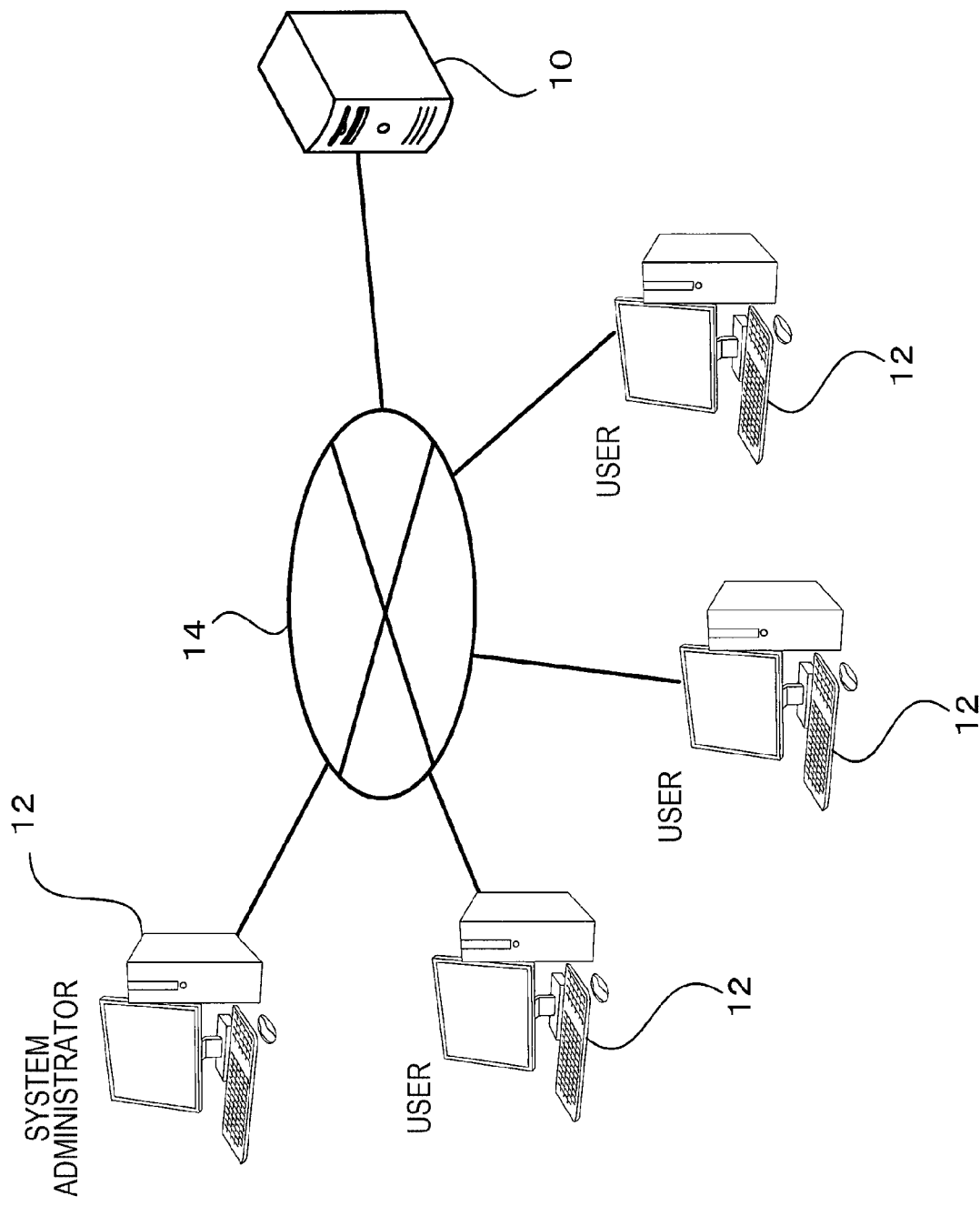
FIG. 1 is a diagram illustrating the configuration of an information processing system according to an exemplary embodiment of the present disclosure.

FIG. 1 is a diagram illustrating the configuration of an information processing system according to an exemplary embodiment of the present disclosure.

As illustrated in FIG. 1, the information processing system according to an exemplary embodiment of the present disclosure is configured by an order management server 10 and terminal apparatuses 12, such as a personal computer which is an information processing apparatus (hereinafter abbreviated as PC), which are connected to each other by a network 14.

The information processing system according to the exemplary embodiment is a system that sets authority granted to a user and identity confirmation requirements demanded on the user for each role assigned to the user. Here, the role refers to a task which is authorized to a user, who is assigned the role, to perform. Specifically, for instance, an administrator of a system that performs order processing sets authority to utilize the system such as order processing and payment processing, and identity confirmation requirements demanded on a user who utilizes the system to restrict utilization of the system by individuals other than the user who is assigned the role, the authority being granted to the user for each role of a person in charge of payment and a person in charge of order assigned to the user.

In the exemplary embodiment below, the information processing system that performs order processing using the order management server 10 will be described. However, the present disclosure is similarly applicable to the case where for each role assigned to a user of a system other than the information processing system that performs order processing, authority granted to the user and identity confirmation requirements demanded on the user are set.

The order management server 10 is an information processing apparatus in which software for managing processing, such as order of products, is installed. A terminal apparatus 12 then takes in data, and performs processing such as order of products using the software which runs on the order management server 10.

It is to be noted that such order management software may be directly installed in each of the terminal apparatuses 12 and used without being installed in the order management server 10.

Figure 2:
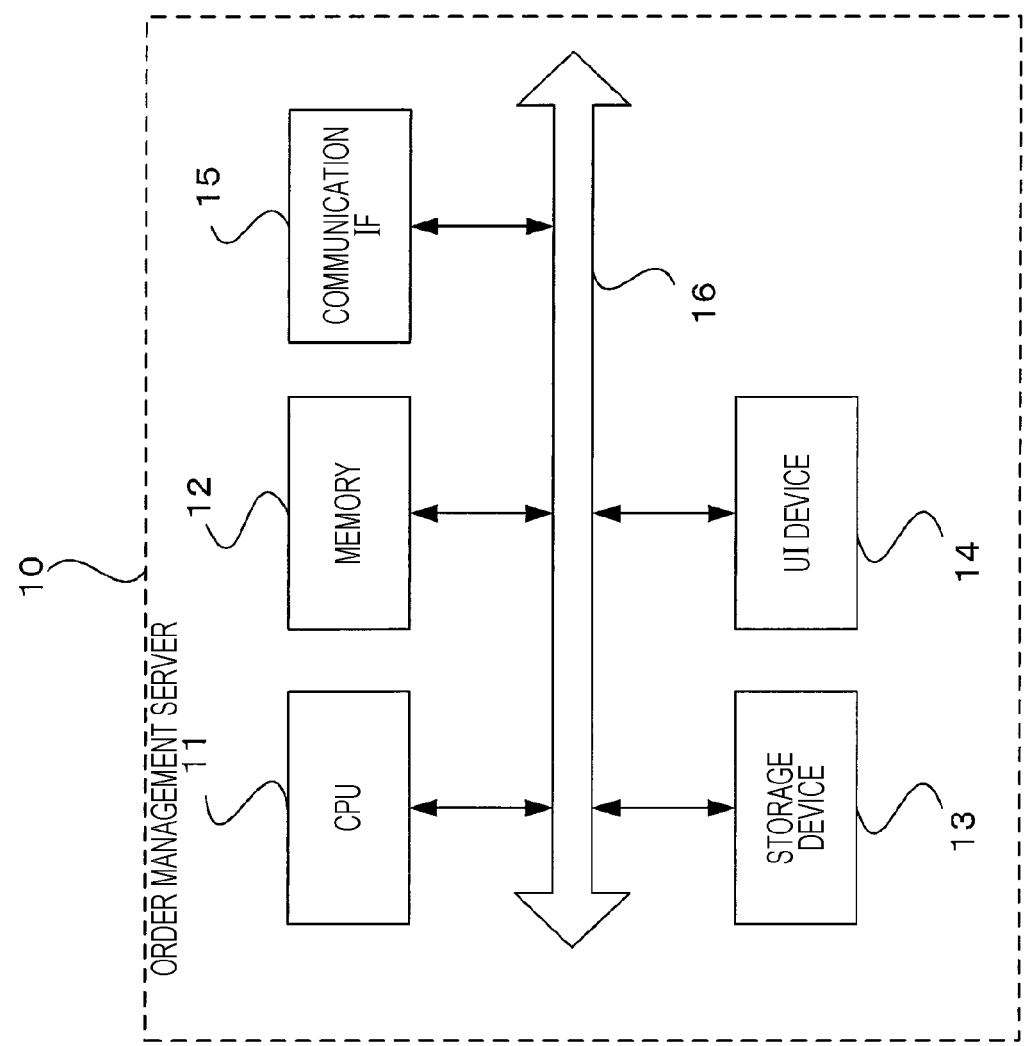
FIG. 2 is a block diagram illustrating the hardware configuration of an order management server according to the exemplary embodiment of the present disclosure.

Next, the hardware configuration of the order management server 10 in the information processing system according to the exemplary embodiment is illustrated in FIG. 2.

As illustrated in FIG. 2, the order management server 10 includes a CPU 11; a memory 12 in which data is temporarily storable; a storage device 13 such as a hard disk drive (HDD); a user interface (UI) device 14 including a touch panel or a liquid crystal display, and a keyboard; and a communication interface (IF) 15 that transmits and receives data to and from an external device. These components are connected to each other via a control bus 16.

The CPU 11 executes predetermined processing, and controls the operation of the order management server 10 based on a control program stored in the memory 12 or the storage device 13. In the exemplary embodiment, a description has been given in which the CPU 11 reads and executes the control program stored in the memory 12 or the storage device 13. However, the program may be stored in a recording medium, such as a CD-ROM, which may be provided to the CPU 11.

Figure 3:
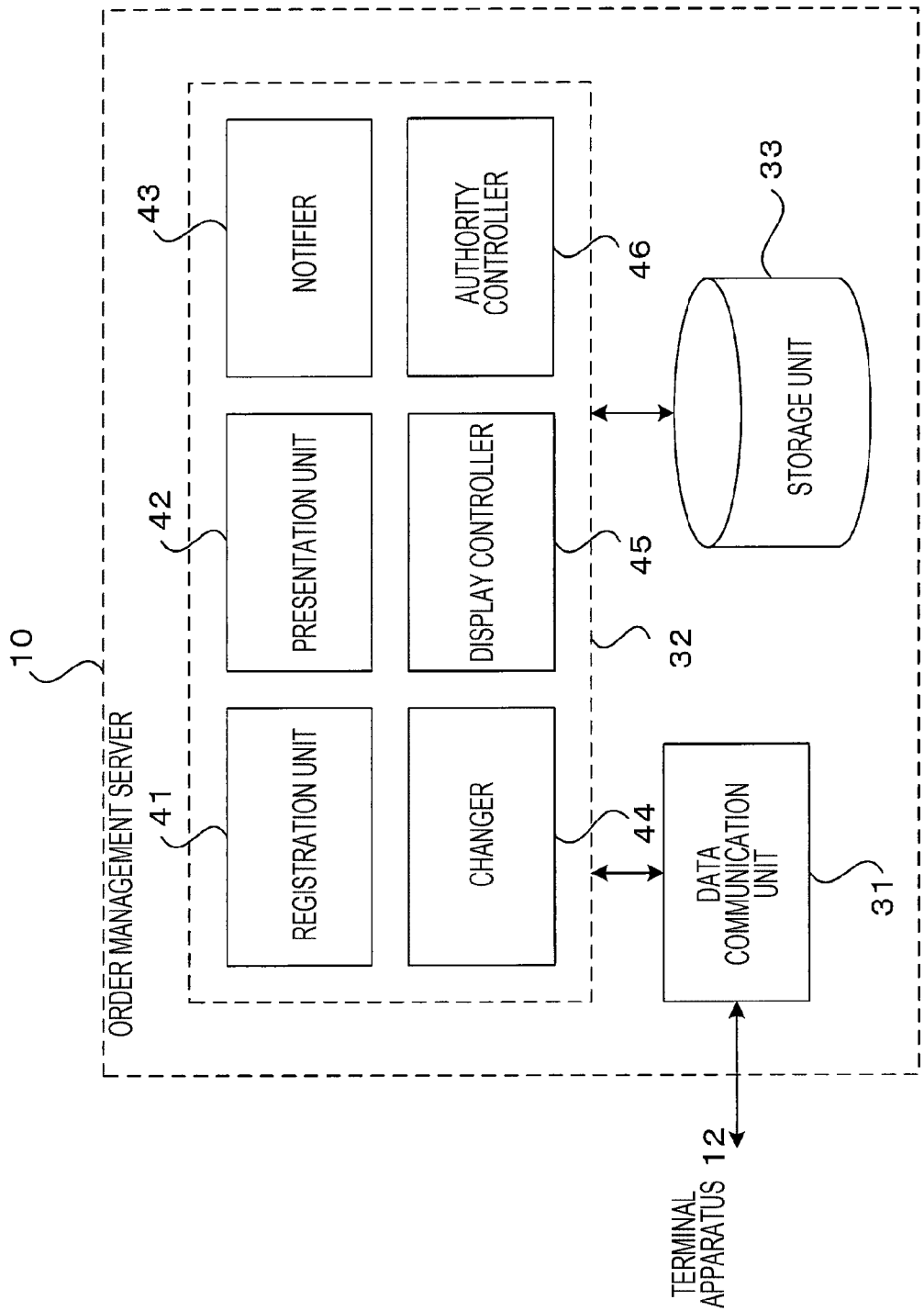
FIG. 3 is a diagram illustrating the functional configuration of the order management server according to the exemplary embodiment of the present disclosure.

FIG. 3 is a block diagram illustrating the functional configuration of the order management server 10 which is implemented by executing the above-mentioned control program.

As illustrated in FIG. 3, the order management server 10 according to the exemplary embodiment includes a data communication unit 31, a controller 32, and a storage 33.

The data communication unit 31 performs data communication with each terminal apparatus 12 via the network 14.

The controller 32 controls the operation of the order management server 10, and includes a registration unit 41, a presentation unit 42, a notifier 43, a changer 44, a display controller 45, and an authority controller 46.

The storage 33 stores various information such as role information, and user information. For instance, as illustrated in FIG. 4, for each role, such as a person in charge of payment and a person in charge of order, information, such as authority granted to a user and identity confirmation requirements demanded on a user, is stored in connection with role information. The authority includes, for instance, order processing, authorization of order, payment processing, authorization of payment, access to invoice, change of account information, and contact with administrator. The identity confirmation requirements include input of mail address, confirmation of email address communication, input of address, confirmation of postal mail address, input of affiliation information, and presentation of a driver's license, an employee id card. For instance, as illustrated in FIG. 5, for each user ID, information, such as password, role granted, confirmed identity confirmation requirements, unconfirmed identity confirmation requirements, is stored in connection with user information. In other words, for each user, the storage 33 stores a role granted, identity confirmation requirements met by the user, and identity confirmation requirements not met by the user.

The registration unit 41 registers a role assigned to a user who utilizes the system. In addition, for each role, the registration unit 41 grants and registers utilizable authority. The registration unit 41 also registers identity confirmation requirements demanded on a user. In other words, for each role assigned to a user who utilizes the system, the registration unit 41 pre-registers authority granted to the user, and identity confirmation requirements demanded on the user. The registration unit 41 also registers information on the user who utilizes the system.

When authority granted to a user is selected for a role selected for registration at the time of registration made by the registration unit, the presentation unit 42 selects and presents identity confirmation requirements corresponding to the selected authority to the user. In other words, when authority granted to a user is selected for a role, identity confirmation requirements demanded on the user are automatically selected, and the presentation unit 42 displays the identity confirmation requirements on a display. In short, the identity confirmation requirements are selected according to selection of authority. Specifically, the contents of authority is classified into three types in the descending order of confidentiality, and the identity confirmation requirements are selected according to the three types of contents of authority. Also, combinations of authority and identity confirmation requirements corresponding to the authority are prepared, and identity confirmation requirements may be automatically selected in conjunction with selection of authority.

The changer 44 changes the identity confirmation requirements by adding or deleting an identity confirmation requirement to or from the identity confirmation requirements presented by the presentation unit 42. In other words, a system administrator is allowed to add or delete an identity confirmation requirement to or from the identity confirmation requirements by the changer 44, which are set to a role registered in the system.

When a new identity confirmation requirement is added to the role of a user registered in the system, the notifier 43 notifies the user who is assigned the role of the added identity confirmation requirement.

The display controller 45 controls the screen which is displayed on each terminal apparatus 12.

In response to assignment of a new role to a user who has been registered in the system, when all the met identity confirmation requirements registered for the assigned role are stored in the storage 33, the authority controller 46 performs control to validate authority according to the role assigned to the user. When a new role is assigned to a user who has been registered in the system, and not all the met identity confirmation requirements registered for the assigned role are stored in the storage 33, the authority controller 46 performs control to invalidate the authority according to the role although the new role is assigned to the user. When a new role is assigned to a user who has been registered in the system, the authority controller 46 performs control to validate only authority of the user validated before the new role is assigned until all the identity confirmation requirements demanded on the user are met. When a new identity confirmation requirement is added to a role which has been registered, the authority controller 46 performs control to invalidate authority of the user who has been assigned the role. When a new added identity confirmation requirement is met, the authority controller 46 performs control to validate authority again, which has been invalidated.

Next the operation of the terminal apparatus 12 and the order management server 10 in the information processing system according to the exemplary embodiment will be described.

In the following, a description will be given under the assumption that let a terminal apparatus 12A be the terminal apparatus 12 utilized by the system administrator who manages the order management server 10, and let a terminal apparatus 12B be the terminal apparatus 12 utilized by a user who uses the order management server 10. When the same component in the terminal apparatus 12A and the terminal apparatus 12B is described, the terminal apparatuses 12A, 12B are referred to as the terminal apparatus 12.

Figure 6:
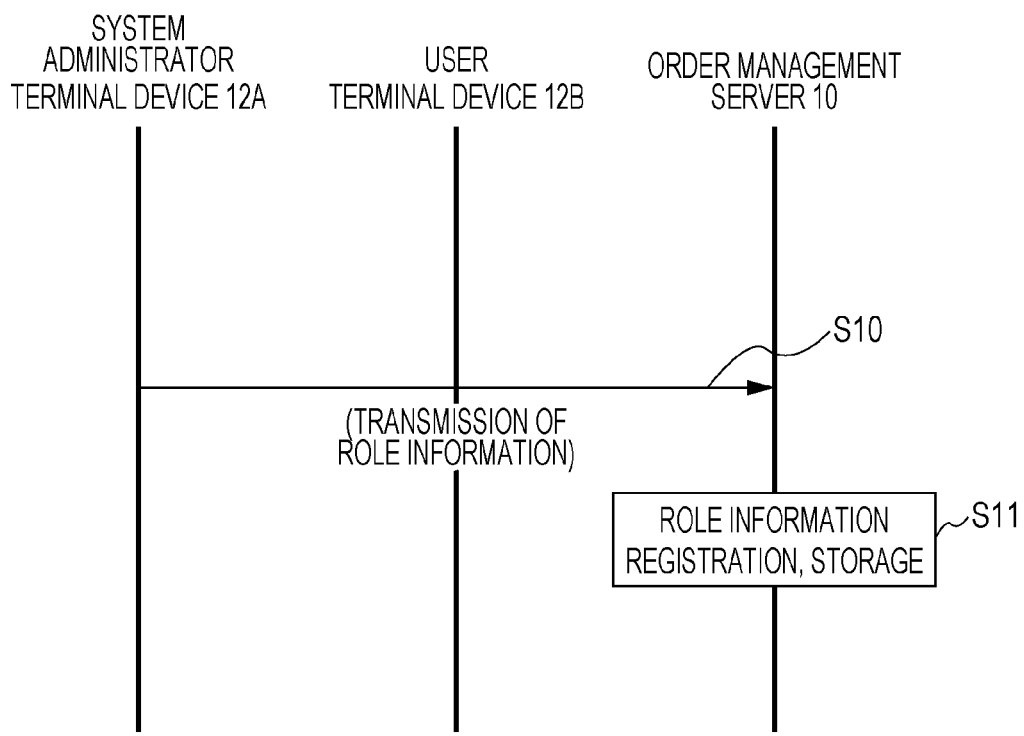
FIG. 6 is a chart for explaining a role information registration operation in a terminal apparatus, and the order management server.

First, a role information registration operation performed by a system administrator will be described with reference to FIGS. 6 and 7. The role registration screen as illustrated in FIG. 7 is displayed on a display 22 of the terminal apparatus 12A. In the role registration screen, a role is defined, then authority which is a function utilizable for the role and identity confirmation requirements necessary for exercising the role are selected. When a registration button 23 is clicked, role information is transmitted to the order management server 10 (step S10), the role information is registered in the order management server 10, and is stored in the storage 33 (step S11). In the role registration screen as illustrated in FIG. 7, identity confirmation requirements are selected according to selection of authority. Specifically, the contents of authority is classified into three types in the descending order of confidentiality, and the identity confirmation requirements are selected according to the three types of contents of authority. Also, combinations of authority and identity confirmation requirements corresponding to the authority are prepared, and identity confirmation requirements may be automatically selected in conjunction with selection of authority. In the terminal apparatus 12A, an operation of a system administrator enables to add or delete an identity confirmation requirement to or from the identity confirmation requirements, which are set to a role registered in the system. The role information is stored in the storage 33 of the order management server 10, and thus authority granted to the user (function utilizable by the user), and identity confirmation requirements demanded on the user are automatically selected by assigning a role to the user who utilizes the later-described system.

Figure 10:
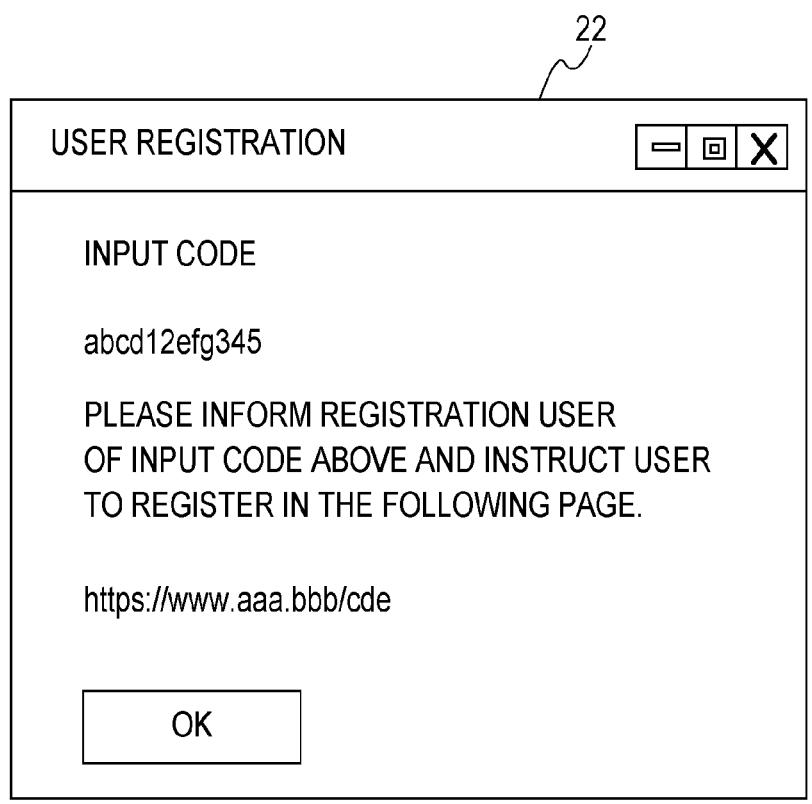
FIG. 10 is a view illustrating a display example of a user registration screen in the terminal apparatus.

Next, a user information registration operation performed by a system administrator will be described with reference to FIGS. 8 to 16. The user registration screen as illustrated in FIG. 9 is displayed on the display 22 of the terminal apparatus 12A. In the user registration screen, the user ID of a user to be registered in the system is inputted, a role assigned to the user is selected, and when "next" button 24 is clicked, information on the user ID and a role assigned to the user ID is transmitted to the order management server 10 (step S20), and is registered and stored in the storage 33 of the order management server 10 (step S21). Since the information registered then does not meet the identity confirmation requirements necessary for exercising the role, the authority may not be exercised. An input code for inputting user information and a URL of a user information registration screen for registering the user information are transmitted from the order management server 10 to the terminal apparatus 12A (step S22), and the user registration screen as illustrated in FIG. 10 is displayed on the display 22 of the terminal apparatus 12A. The input code is a character string temporarily issued to uniquely identify a user.

Figure 11:
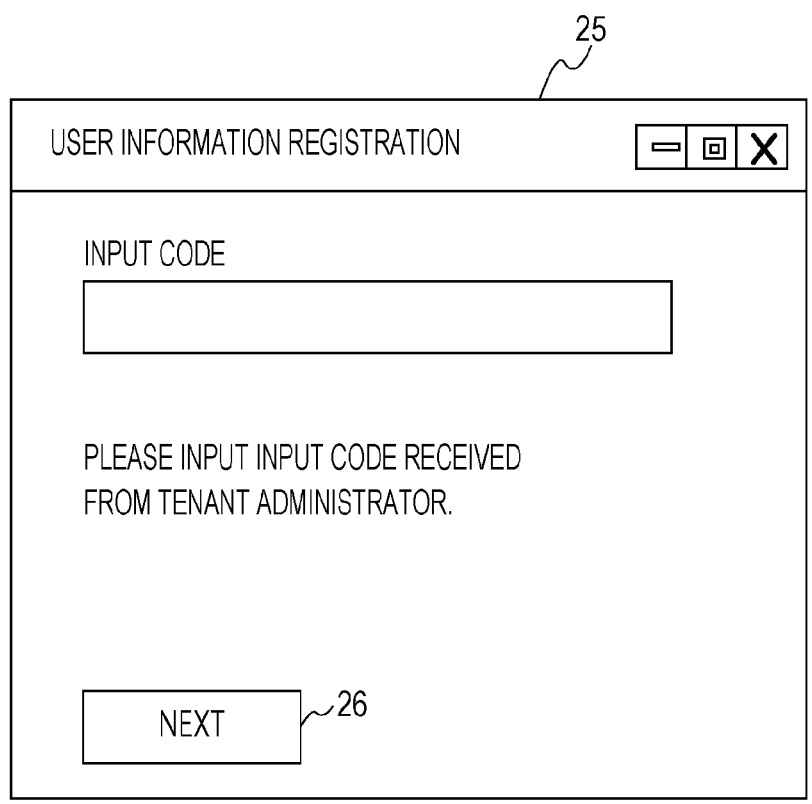
FIG. 11 is a view illustrating a display example of a user registration screen in the other terminal apparatus.

The input code and the URL of the user information registration screen are transmitted from the terminal apparatus 12A to the terminal apparatus 12B (step S23), and when the URL of the user information registration screen is accessed in the terminal apparatus 12B, the user information registration screen as illustrated in FIG. 11 is displayed on a display 25 of the terminal apparatus 12B. When the input code is inputted in the user information registration screen and "next" button 26 is clicked (step S24), the input code is transmitted to the order management server 10 (step S25).

As an access method for URL of the user information registration screen other than the transmission of the URL of the user information registration screen from the order management server 10 by e-mail, a registration code is drawn, and may be transmitted by e-mail or postal mail, or the registration code is converted to a bar code, and an image may be generated and transmitted.

The order management system 10 then identifies the user from the transmitted input code, retrieves identity confirmation requirements in association with the role set to the identified user from the user information stored in the storage 33, and the user information registration screen including the input items as illustrated in FIG. 12 is displayed on the display 25 of the terminal apparatus 12B (step S26).

Figure 13:
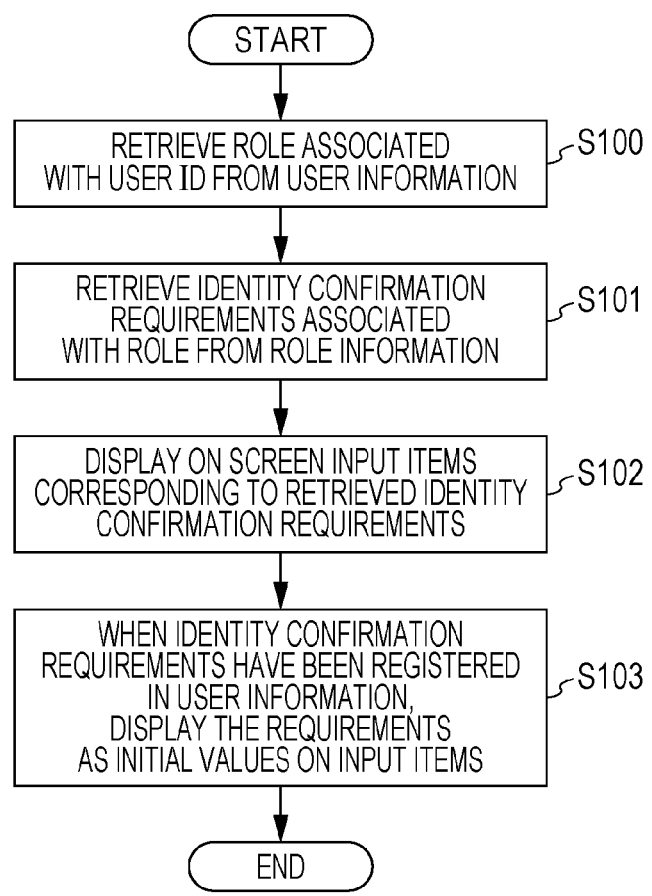
FIG. 13 is a flowchart for explaining a display operation of a user information registration screen in the order management server.

Here, the display operation on the user information registration screen of the display controller 45 will be described in detail with reference to FIG. 13. When the input code is transmitted, a role in connection with the user ID is retrieved from the user information stored in the storage 33 of the order management server 10 (step S100). Identity confirmation requirements in connection with the retrieved role are retrieved from the role information stored in the storage 33 (step S101). As illustrated in FIG. 12, the display controller 45 performs control to display input items corresponding to the retrieved identity confirmation requirements on the user information registration screen (step S102). It is to be noted that when already registered identity confirmation requirements are included in the user information stored in the storage 33, the display controller 45 performs control to display the input items as the initial values (step S103).

That is, identity confirmation requirements corresponding to the authority set for the role assigned to the user are selected and displayed on the terminal apparatus 12B of the user. Specifically, in addition to the input items of a user ID and a password, input items of identity confirmation requirements corresponding to the authority set to a role assigned to the user ID are displayed on the display 25.

In the user information registration screen as illustrated in FIG. 12, the input items are inputted, and when an employee ID card or an insurance card needs to be presented, the image of an employee ID card or an insurance card is uploaded, and when a registration button 27 is clicked (step S27), the user registration information is transmitted to the order management server 10 (step S28). The user registration information confirmation screen as illustrated in FIG. 14 is displayed on the display 22 of the terminal apparatus 12A (step S29).

Here, the display operation on the user registration information confirmation screen of the display controller 45 will be described with reference to FIG. 15. When the user registration information is transmitted, a role in connection with the user ID is retrieved from the user information stored in the storage 33 of the order management server 10 (step S200). Identity confirmation requirements in connection with the retrieved role are retrieved from the role information stored in the storage 33 (step S201). As illustrated in FIG. 14, based on the transmitted user registration information, the display controller 45 performs control to display input items, input contents, and confirmation check boxes 28 corresponding to the retrieved identity confirmation requirements on the user registration information confirmation screen (step S202). When already registered confirmed identity confirmation requirements are included in the user information stored in the storage 33, the display controller 45 performs control to check (turn on) and display the confirmation check boxes 28 for input items of confirmed identity confirmation requirements (step S203). An item with the confirmation check box checked is registered and stored as a "confirmed identity confirmation requirement", and an item with the confirmation check box unchecked is registered and stored as an "unconfirmed identity confirmation requirement" in the user information of the storage 33.

Specifically, a system administrator checks contents inputted in the user registration information confirmation screen. For instance, as a result of e-mail transmission of URL of the user information registration screen, when input is made from the user information registration screen, confirmation of email address communication is made, and a corresponding identity confirmation requirement is met, which is stored in the storage 33 as a confirmed identity confirmation requirement. A system administrator calls a telephone number inputted in the user information registration screen to confirm the identity, and thus confirmation of telephone communication is made, and a corresponding identity confirmation requirement is met, which is stored in the storage 33 as a confirmed identity confirmation requirement. Also, a system administrator checks individual information such as an address, a birth date using the image of a driver's license or an employee ID card attached, and a corresponding identity confirmation requirement for the presentation of a driver's license and an employee ID card is met, which is stored in the storage 33 as a confirmed identity confirmation requirement. The input of affiliation information is confirmed by an identifier of the terminal apparatus 12B via which user registration is made or a business enterprise code in association with the identifier.

Figure 14:
FIG. 14 is a view illustrating a display example of a user registration information confirmation screen in the terminal apparatus.
Figure 15:
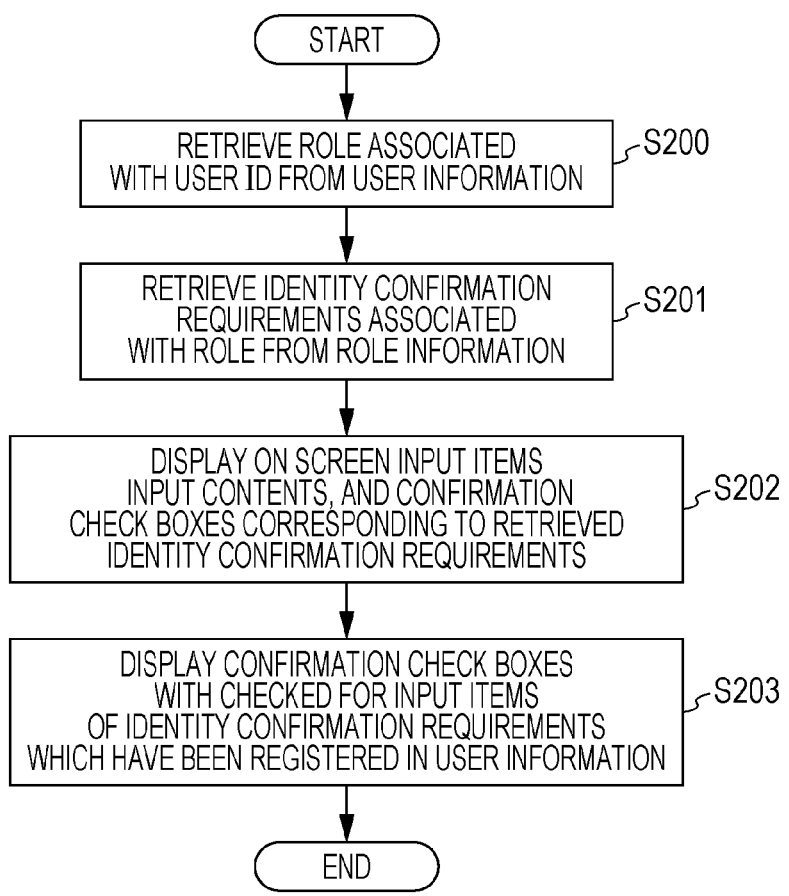
FIG. 15 is a flowchart for explaining a display operation of a user registration information confirmation screen in the order management server.

In the user registration information confirmation screen as illustrated in FIG. 14, when the confirmation buttons 28 are checked and the registration button 29 is clicked (step S30), user registration confirmed information is transmitted to the order management server 10 (step S31), and user information is registered in the order management server 10, and is stored in the storage 33 (step S32).

The order management server 10 checks to see if identity confirmation requirements corresponding to the role assigned to the user are met, and when all the identity confirmation requirements are met, validates the authority granted to the role (step S33). Thus, the terminal apparatus 12B is able to exercise the authority granted to the role (step S34). When the identity confirmation requirements are not met, an input code is issued again.

Figure 16:
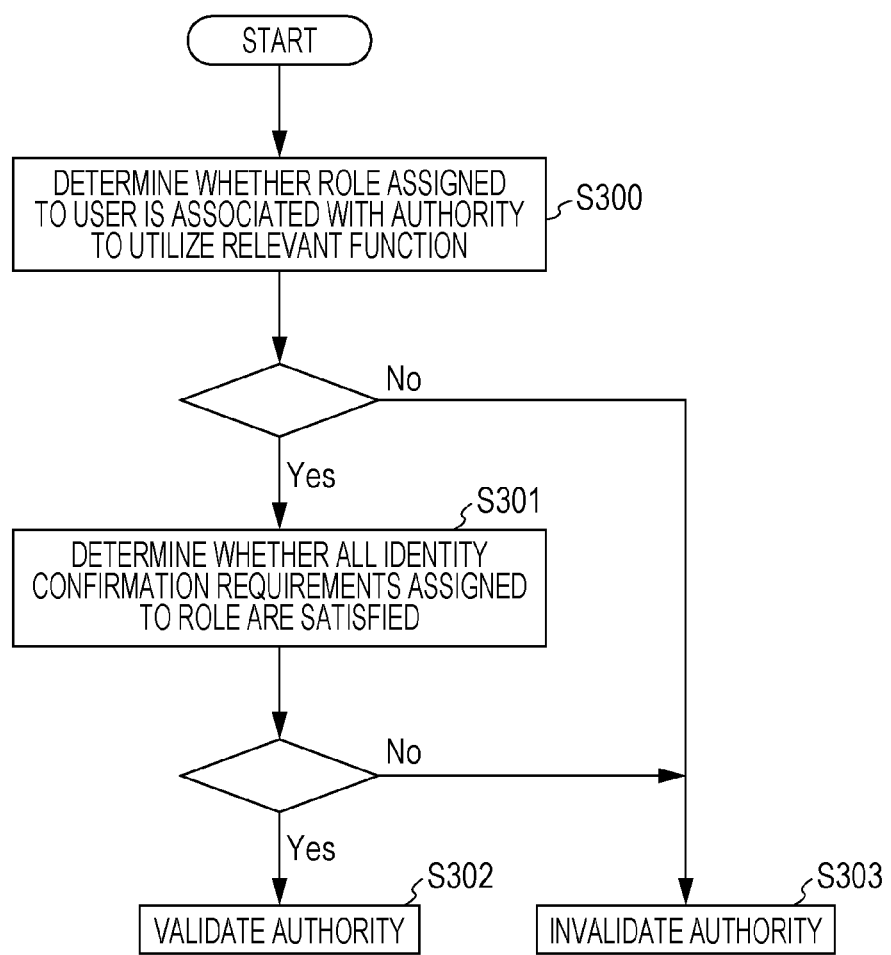
FIG. 16 is a flowchart for explaining an operation of an authority controller in the order management server.

Next, the operation of the authority controller 46 will be described in detail with reference to FIG. 16.

The authority controller 46 determines whether or not the role assigned to a user who has been registered in the system is associated with authority to utilize a relevant function (step S300). In other words, the authority controller 46 determines whether or not the assigned role in connection with authority to utilize the relevant function is stored in the storage 33. When it is determined that the assigned role is not in association with (not in connection with) authority (No in step S300), the authority controller 46 performs control to invalidate the authority according to the role assigned to the user (step S303). That is, the user is unable to utilize the relevant function.

When it is determined that the assigned role is in association with (in connection with) authority (Yes in step S300), the authority controller 46 determines whether or not all the identity confirmation requirements for the assigned role are met (step S301). When all the met identity confirmation requirements for the role assigned to the user are stored in the storage 33 (Yes in step S301), the authority controller 46 performs control to validate authority according to the role assigned to the user (step S302). That is, the user is able to utilize the relevant function.

When not all the met identity confirmation requirements registered for the assigned role are stored in the storage 33 (No in step S301), the authority controller 46 performs control to invalidate the authority according to the role although the new role is assigned to the user (step S303). The authority controller 46 performs control to validate only authority of the user validated before the new role is assigned until all the identity confirmation requirements demanded on the user are met.

When a new identity confirmation requirement is added to a role which has been registered, the authority controller 46 performs control to invalidate authority of the user who has been assigned the role. In this case, the user who has been assigned the role is notified of the added identity confirmation requirement by the notifier 43. When a new added identity confirmation requirement is met, the authority controller 46 performs control to validate authority again, which has been invalidated.

Modifications

In the exemplary embodiment, a description has been given using an example in which the present disclosure is applied to a terminal apparatus, such as a personal computer, as the information processing apparatus. However, the present disclosure is not limited to this, and is similarly applicable to other information processing apparatuses, such as a smartphone, and a tablet terminal device.

The exemplary embodiment of the present disclosure has been specifically described above. However, the present disclosure is not limited to the exemplary embodiment described above, and various modifications are possible without departing from the spirit of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory, storing a program and information on identity confirmation which has been performed by a plurality of users; and
a processor, executing the program to be configured to
for a role to be assigned to users who utilize a system, pre-register authority to be granted and identity confirmation to be required in association with the role;
in response to assignment of a new role to a user, in a case where the information stored in the memory indicates that the user has performed the identity confirmation associated to the new role, control to validate authority associated with the new role,
wherein in response to the assignment of the new role to the user, and in a case where the information stored in the memory indicates that the user has not performed the identity confirmation associated to the new role, the processor is configured to invalidate the authority associated with the new role whereas maintain the role being assigned to the user.

2. The information processing apparatus according to claim 1,
wherein in a case where the information, stored in the memory, indicates that the user has not performed the identity confirmation associated to the new role, the processor is configured to validate only authority which has been validated before the new role is assigned until all the required identity confirmation is performed.

3. The information processing apparatus according to claim 1, the processor is further configured to
in response to authority to be associated a role being selected at time of registration, presents identity confirmation requirements corresponding to the selected authority.

4. The information processing apparatus according to claim 2, the processor is further configured to
in response to authority to be associated a role being selected at time of registration, presents identity confirmation requirements corresponding to the selected authority.

5. The information processing apparatus according to claim 3, the processor is further configured to
change the identity confirmation to be requested, which is presented by the processor, by adding or deleting an identity confirmation requirement.

6. The information processing apparatus according to claim 4, the processor is further configured to
change the identity confirmation to be requested, which is presented by the processor, by adding or deleting an identity confirmation requirement.

7. The information processing apparatus according to claim 1,
wherein when a new identity confirmation is further associated to a role which has been registered, the processor is further configured to control to invalidate the authority which has been validated to a user who has been assigned the role.

8. The information processing apparatus according to claim 7, the processor is further configured to
when the new identity confirmation is further associated with the role, notify a user who is assigned the role of the new identity confirmation requirement added.

9. The information processing apparatus according to claim 7,
wherein when a newly associated identity confirmation is performed, the processor is further configured to control to validate the authority again, which has been invalidated.

10. The information processing apparatus according to claim 8,
wherein when a newly associated identity confirmation is performed, the processor is further configured to control to validate the authority again, which has been invalidated.

11. A non-transitory computer readable medium storing a program causing a computer to execute a process comprising:
for a role to be assigned to users who utilize a system, pre-registering authority to be granted and identity confirmation to be required in association with the role;
for each of the users, storing information on identity confirmation which has been performed by the users; and
in response to assignment of a new role to a user, in a case where the stored information which indicates that the user has performed the identity confirmation associated to the new role, controlling to validate authority associated with the new role,
wherein in response to the assignment of the new role to the user, and in a case where the stored information indicates that the user has not performed the identity confirmation associated to the new role, invalidating the authority associated with the new role whereas maintaining the role being assigned to the user.

* * * * *